(12) United States Patent
Bass et al.

(10) Patent No.: US 6,713,023 B2
(45) Date of Patent: Mar. 30, 2004

(54) FLOW CELL FOR CHEMICAL REACTIONS

(75) Inventors: Jay K. Bass, Mountain View, CA (US); John F. McEntee, Boulder Creek, CA (US); Tim J. Lazaruk, Redwood City, CA (US); Maryam Mobed-Miremadi, Sunnyvale, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 0 days.

(21) Appl. No.: 09/896,596

(22) Filed: Jun. 29, 2001

(65) Prior Publication Data

US 2003/0003504 A1 Jan. 2, 2003

(51) Int. Cl.[7] .............................. B01L 3/00; B01L 11/00; B01L 9/00; G01N 15/06; G01N 35/00
(52) U.S. Cl. ........................... 422/102; 422/50; 422/58; 422/68.1; 422/81; 422/82; 422/100; 422/103; 422/104; 436/43
(58) Field of Search ................................ 422/102, 100, 422/103, 104, 82, 81, 50, 58, 68.1; 436/43

(56) References Cited

U.S. PATENT DOCUMENTS

| | | | | |
|---|---|---|---|---|
| 5,100,775 A | * | 3/1992 | Smyczek et al. | 435/6 |
| 5,650,327 A | * | 7/1997 | Copeland et al. | 436/46 |
| 5,695,942 A | * | 12/1997 | Farmilo et al. | 435/7.1 |
| 5,958,760 A | | 9/1999 | Freeman | 435/286.5 |
| 5,981,733 A | | 11/1999 | Gamble et al. | 536/25.3 |
| 6,015,531 A | * | 1/2000 | Colin et al. | 422/58 |
| 6,114,122 A | | 9/2000 | Besemer et al. | 435/6 |
| 6,150,147 A | | 11/2000 | Goldberg et al. | 435/173.1 |
| 6,258,593 B1 | * | 7/2001 | Schembri et al. | 435/287.2 |
| 6,274,091 B1 | * | 8/2001 | Mohan et al. | 422/103 |
| 6,325,975 B1 | * | 12/2001 | Naka et al. | 422/61 |
| 6,382,693 B1 | * | 5/2002 | Ljungmann | 294/64.1 |
| 6,395,536 B2 | * | 5/2002 | Freeman | 435/286.5 |
| 6,448,066 B1 | * | 9/2002 | Wheatcroft | 435/287.2 |

\* cited by examiner

*Primary Examiner*—Jill Warden
*Assistant Examiner*—Brian Sines (57) ABSTRACT

Devices and methods are disclosed for synthesizing compounds on the surface of supports. The devices are flow devices, which include a housing comprising a housing chamber. The housing has an opening adapted for insertion of a support into the housing chamber. A sealing member is movably mounted in the housing chamber and adapted to engage the support to form a reagent chamber between a surface of the support and a surface of the sealing member. A mechanism is included for moving the sealing member within the housing chamber. The device has both an inlet and an outlet, which are both in fluid communication with the reagent chamber. In the methods of the invention a support is placed into a chamber of a device such as described above. The mechanism adapted to engage the support on a surface opposite the surface engaged by the sealing member is activated to urge the support toward the sealing member. The pressure-activated mechanism is activated to urge the support against the aforesaid mechanism and against an interior wall of the housing chamber to form the reagent chamber. A fluid reagent for conducting the reaction step is introduced into the reagent chamber by means of the inlet. Thereafter, the fluid reagent is removed from the reagent chamber. The pressure-activated mechanism is deactivated and the support is removed from the housing chamber. In this way the reagent chamber is formed and un-formed in situ.

33 Claims, 4 Drawing Sheets

FLOW CELL FOR CHEMICAL REACTIONS

BACKGROUND OF THE INVENTION

This invention relates to reaction vessels for carrying out steps in the synthesis of a chemical compound. More particularly, the invention relates to devices for the manufacture of supports having bound to the surfaces thereof a plurality of chemical compounds, such as biopolymers, which are prepared on the surface in a series of steps.

In the field of diagnostics and therapeutics, it is often useful to attach species to a surface. One important application is in solid phase chemical synthesis wherein initial derivatization of a substrate surface enables synthesis of polymers such as oligonucleotides and peptides on the substrate itself. Support bound oligomer arrays, particularly oligonucleotide arrays, may be used in screening studies for determination of binding affinity. Modification of surfaces for use in chemical synthesis has been described. See, for example, U.S. Pat. No. 5,624,711 (Sundberg), U.S. Pat. No. 5,266,222 (Willis) and U.S. Pat. No. 5,137,765 (Farnsworth).

Determining the nucleotide sequences and expression levels of nucleic acids (DNA and RNA) is critical to understanding the function and control of genes and their relationship, for example, to disease discovery and disease management. Analysis of genetic information plays a crucial role in biological experimentation. This has become especially true with regard to studies directed at understanding the fundamental genetic and environmental factors associated with disease and the effects of potential therapeutic agents on the cell. Such a determination permits the early detection of infectious organisms such as bacteria, viruses, etc.; genetic diseases such as sickle cell anemia; and various cancers. This paradigm shift has lead to an increasing need within the life science industries for more sensitive, more accurate and higher-throughput technologies for performing analysis on genetic material obtained from a variety of biological sources.

Unique or misexpressed nucleotide sequences in a polynucleotide can be detected by hybridization with a nucleotide multimer, or oligonucleotide, probe. Hybridization is based on complementary base pairing. When complementary single stranded nucleic acids are incubated together, the complementary base sequences pair to form double stranded hybrid molecules. These techniques rely upon the inherent ability of nucleic acids to form duplexes via hydrogen bonding according to Watson-Crick base-pairing rules. The ability of single stranded deoxyribonucleic acid (ssDNA) or ribonucleic acid (RNA) to form a hydrogen bonded structure with a complementary nucleic acid sequence has been employed as an analytical tool in molecular biology research. An oligonucleotide probe employed in the detection is selected with a nucleotide sequence complementary, usually exactly complementary, to the nucleotide sequence in the target nucleic acid. Following hybridization of the probe with the target nucleic acid, any oligonucleotide probe/nucleic acid hybrids that have formed are typically separated from unhybridized probe. The amount of oligonucleotide probe in either of the two separated media is then tested to provide a qualitative or quantitative measurement of the amount of target nucleic acid originally present.

Direct detection of labeled target nucleic acid hybridized to surface-bound polynucleotide probes is particularly advantageous if the surface contains a mosaic of different probes that are individually localized to discrete, known areas of the surface. Such ordered arrays containing a large number of oligonucleotide probes have been developed as tools for high throughput analyses of genotype and gene expression. Oligonucleotides synthesized on a solid support recognize uniquely complementary nucleic acids by hybridization, and arrays can be designed to define specific target sequences, analyze gene expression patterns or identify specific allelic variations. The arrays may be used for conducting cell study, for diagnosing disease, identifying gene expression, monitoring drug response, determination of viral load, identifying genetic polymorphisms, analyze gene expression patterns or identify specific allelic variations, and the like.

In one approach, cell matter is lysed, to release its DNA as fragments, which are then separated out by electrophoresis or other means, and then tagged with a fluorescent or other label. The resulting DNA mix is exposed to an array of oligonucleotide probes, whereupon selective binding to matching probe sites takes place. The array is then washed and interrogated to determine the extent of hybridization reactions. In one approach the array is imaged so as to reveal for analysis and interpretation the sites where binding has occurred. Arrays of different chemical probe species provide methods of highly parallel detection, and hence improved speed and efficiency, in assays. Assuming that the different sequence polynucleotides were correctly deposited in accordance with the predetermined configuration, then the observed binding pattern will be indicative of the presence and/or concentration of one or more polynucleotide components of the sample.

The arrays may be microarrays created by in-situ synthesis, oligonucleotide deposition or cDNA. In general, arrays are synthesized on a surface of a substrate by one of any number of synthetic techniques that are known in the art. In one approach to the synthesis of microarrays flow cells or flow devices are employed in which a substrate is placed to carry out the synthesis.

SUMMARY OF THE INVENTION

One embodiment of the present invention is a flow device, which includes a housing comprising a housing chamber. The housing has an opening adapted for insertion of a support into the housing chamber. A sealing member is movably mounted in the housing chamber and adapted to engage the support to form a reagent chamber between a surface of the support and a surface of the sealing member. A mechanism is included for moving the sealing member within the housing chamber. The device has both an inlet and an outlet, which are both in fluid communication with the reagent chamber. In one embodiment a wall of the device comprises a viewing area such as, for example, a window, for viewing the surface of a support that is inserted into the housing chamber.

Another embodiment of the present invention is a flow device comprising a housing with a housing chamber. An opening is provided in the housing and is adapted for insertion of a holding element comprising a support into the housing chamber. A sealing member is movably mounted in the housing chamber and adapted to engage the support to form a reagent chamber between a surface of the support and a surface of the sealing member. The sealing member is attached to a pressure-activated mechanism for moving the sealing member within the housing chamber. The device also comprises a mechanism adapted to engage the support on a surface opposite the surface engaged by the sealing member. The device has an inlet and an outlet, both of which are in fluid communication with the reagent chamber. One wall of the housing has a viewing area adapted for viewing a surface of the support.

Another embodiment of the present invention is a method for performing a step of a chemical reaction on the surface of a support. A support is placed into a chamber of a device such as described above. The mechanism adapted to engage the support on a surface opposite the surface engaged by the sealing member is activated to urge the support toward the sealing member. The pressure-activated mechanism is activated to urge the support against the aforesaid mechanism and against an interior wall of the housing chamber to form the reagent chamber. A fluid reagent for conducting the reaction step is introduced into the reagent chamber by means of the inlet. Thereafter, the fluid reagent is removed from the reagent chamber. The pressure-activated mechanism is deactivated and the support is removed from the housing chamber.

Another embodiment of the present invention is a method for performing a step of a chemical reaction on the surface of a support. A support is placed into a chamber of a device. A mechanism is activated to engage the support on a surface thereof. A pressure-activated mechanism is activated for moving a sealing member within the chamber to engage a surface of the support opposite the surface engaged by the above mechanism, which is then deactivated thereby forming a reagent chamber. A fluid reagent for conducting the reaction step is introduced into the reagent chamber. After a period of time, the fluid reagent is removed from the reagent chamber. The pressure-activated mechanism is deactivated and the support is removed from the chamber.

Another embodiment of the present invention is a method for synthesizing a plurality of biopolymers on the surface of a support. The synthesis comprises a plurality of monomer additions. After each of the monomer additions, the support is placed into a chamber of a first device as described above. The surface of the support is subjected to a first step of the synthesis that is subsequent to a monomer addition. Then, the support is placed into a chamber of a second device as described above. The surface of the support is subjected to a second step of the synthesis that is subsequent to the first step.

Another embodiment of the present invention is an apparatus for synthesizing an array of biopolymers on the surface of a support. The apparatus comprises a platform on which are mounted a plurality of devices as described above. The apparatus also comprises one or more fluid dispensing stations mounted on the platform. The stations are in fluid communication with one or more of the devices. A station for monomer addition to the surface of the support is mounted on the platform. The apparatus also comprises a mechanism, which comprises a holding element for moving a support to and from the station for monomer addition and one of the devices and from one of the devices to another of the devices. The apparatus optionally comprises a mechanism for rotating the devices.

Another embodiment of the present invention is a device for transferring a support from one flow cell to another flow cell. The device comprises a vacuum actuated element for holding the support and a mechanism for moving the vacuum actuated element from one flow cell to another flow. The mechanism may be part of a robotic arm and the vacuum actuated element may comprise at least two prongs.

DETAILED DESCRIPTION OF THE INVENTION

In its broadest aspect the present invention provides a flow device having a reagent chamber that is formed in situ. The device comprises a sealing member adapted for sealing engagement with a support to form the reagent chamber in situ. The device further comprises an inlet and an outlet, both of which are in fluid communication with the reagent chamber. Also included within the broadest scope of the invention is a method for performing a step of a chemical reaction on the surface of a support. A reaction chamber is formed in situ where the reaction chamber comprises the surface of the support and a sealing member. A fluid reagent for conducting the reaction step is introduced into the reagent chamber. Thereafter, the fluid reagent is removed from the reagent chamber. The support and the sealing member are separated and the reaction chamber is no longer formed.

The present devices and methods may be employed in the synthesis of a plurality of chemical compounds on supports. Usually, the chemical compounds are those which are synthesized in a series of steps such as, for example, the addition of building blocks, which are chemical components of the chemical compound. Examples of such building blocks are those found in the synthesis of polymers. The devices of the invention may be used for each sequential step in the synthesis of chemical compounds or a plurality of devices may be employed, in each of which a different repetitive step in the synthesis of the chemical compounds is conducted.

As mentioned above, the chemical compounds are those that are synthesized in a series of steps, which usually involve linking together building blocks that form the chemical compound. The invention has particular application to the synthesis of oligomers or polymers. The oligomer or polymer is a chemical entity that contains a plurality of monomers. It is generally accepted that the term "oligomers" is used to refer to a species of polymers. The terms "oligomer" and "polymer" may be used interchangeably herein. Polymers usually comprise at least two monomers. Oligomers generally comprise about 6 to about 20,000 monomers, preferably, about 10 to about 10,000, more preferably about 15 to about 4,000 monomers. Examples of polymers include polydeoxyribonucleotides, polyribonucleotides, other polynucleotides that are C-glycosides of a purine or pyrimidine base, or other modified polynucleotides, polypeptides, polysaccharides, and other chemical entities that contain repeating units of like chemical structure. Exemplary of oligomers are oligonucleotides and peptides.

A monomer is a chemical entity that can be covalently linked to one or more other such entities to form an oligomer or polymer. Examples of monomers include nucleotides, amino acids, saccharides, peptoids, and the like and subunits comprising nucleotides, amino acids, saccharides, peptoids and the like. The subunits may comprise all of the same component such as, for example, all of the same nucleotide or amino acid, or the subunit may comprise different components such as, for example, different nucleotides or different amino acids. In general, the monomers have first and second sites (e.g., C-termini and N-termini, or 5' and 3' sites) suitable for binding of other like monomers by means of standard chemical reactions (e.g., condensation, nucleophilic displacement of a leaving group, or the like), and a diverse element that distinguishes a particular monomer from a different monomer of the same type (e.g., an amino acid side chain, a nucleotide base, etc.). The initial substrate-bound monomer is generally used as a building block in a multi-step synthesis procedure to form a complete ligand, such as in the synthesis of oligonucleotides, oligopeptides, oligosaccharides, etc. and the like.

Polynucleotides are compounds or compositions that are polymeric nucleotides or nucleic acid polymers. The polynucleotide may be a natural compound or a synthetic compound. Polynucleotides include oligonucleotides and are comprised of natural nucleotides such as ribonucleotides and deoxyribonucleotides and their derivatives although unnatural nucleotide mimetics such as 2'-modified nucleosides, peptide nucleic acids and oligomeric nucleoside phosphonates are also used. The polynucleotide can have from about 2 to 5,000,000 or more nucleotides. Usually, the oligonucleotides are at least about 2 nucleotides, preferably, about 5 to about 100 nucleotides, more preferably, about 10 to about 50 nucleotides, and usually, about 15 to about 30 nucleotides, in length.

The support to which a plurality of chemical compounds is attached is usually a porous or non-porous water insoluble material. The support can have any one of a number of shapes, such as strip, plate, disk, rod, particle, and the like. The support can be hydrophilic or capable of being rendered hydrophilic or it may be hydrophobic. The support is usually glass such as flat glass whose surface has been chemically activated to support binding or synthesis thereon, glass available as Bioglass and the like. However, the support may be made from materials such as inorganic powders, e.g., silica, magnesium sulfate, and alumina; natural polymeric materials, particularly cellulosic materials and materials derived from cellulose, such as fiber containing papers, e.g., filter paper, chromatographic paper, etc.; synthetic or modified naturally occurring polymers, such as nitrocellulose, cellulose acetate, poly (vinyl chloride), polyacrylamide, cross linked dextran, agarose, polyacrylate, polyethylene, polypropylene, poly(4-methylbutene), polystyrene, polymethacrylate, poly(ethylene terephthalate), nylon, poly (vinyl butyrate), etc.; either used by themselves or in conjunction with other materials; ceramics, metals, and the like. Preferably, for packaged arrays the support is a non-porous material such as glass, plastic, metal and the like.

The surface of a support is normally treated to create a primed or functionalized surface, that is, a surface that is able to support the synthetic steps involved in the production of the chemical compound. Functionalization relates to modification of the surface of a support to provide a plurality of functional groups on the support surface. By the term "functionalized surface" is meant a support surface that has been modified so that a plurality of functional groups are present thereon. The manner of treatment is dependent on the nature of the chemical compound to be synthesized and on the nature of the support surface. In one approach a reactive hydrophilic site or reactive hydrophilic group is introduced onto the surface of the support. Such hydrophilic moieties can be used as the starting point in a synthetic organic process.

In one embodiment, the surface of the support, such as a glass support, is siliceous, i.e., comprises silicon oxide groups, either present in the natural state, e.g., glass, silica, silicon with an oxide layer, etc., or introduced by techniques well known in the art. One technique for introducing siloxyl groups onto the surface involves reactive hydrophilic moieties on the surface. These moieties are typically epoxide groups, carboxyl groups, thiol groups, and/or substituted or unsubstituted amino groups as well as a functionality that may be used to introduce such a group such as, for example, an olefin that may be converted to a hydroxyl group by means well known in the art. One approach is disclosed in U.S. Pat. No. 5,474,796 (Brennan), the relevant portions of which are incorporated herein by reference. A siliceous surface may be used to form silyl linkages, i.e., linkages that involve silicon atoms. Usually, the silyl linkage involves a silicon-oxygen bond, a silicon-halogen bond, a silicon-nitrogen bond, or a silicon-carbon bond.

A procedure for the derivatization of a metal oxide surface uses an aminoalkyl silane derivative, e.g., trialkoxy 3-aminopropylsilane such as aminopropyltriethoxy silane (APS), 4-aminobutyltrimethoxysilane, 4-aminobutyltriethoxysilane, 2-aminoethyltriethoxysilane, and the like. APS reacts readily with the oxide and/or siloxyl groups on metal and silicon surfaces. APS provides primary amine groups that may be used to carry out the present methods. Such a derivatization procedure is described in EP 0 173 356 B1, the relevant portions of which are incorporated herein by reference. Other methods for treating the surface of a support will be suggested to those skilled in the art in view of the teaching herein.

The devices and methods of the present invention are particularly useful in the synthesis of arrays of biopolymers. A biopolymer is a polymer of one or more types of repeating units relating to biology. Biopolymers are typically found in biological systems (although they may be made synthetically) and particularly include peptides or polynucleotides, as well as such compounds composed of or containing amino acid analogs or non-amino acid groups, or nucleotide analogs or non-nucleotide groups. This includes polynucleotides in which the conventional backbone has been replaced with a non-naturally occurring or synthetic backbone, and nucleic acids (or synthetic or naturally occurring analogs) in which one or more of the conventional bases has been replaced with a group (natural or synthetic) capable of participating in Watson-Crick type hydrogen bonding interactions.

An array includes any one, two or three dimensional arrangement of addressable regions bearing a particular biopolymer such as polynucleotides, associated with that region. An array is addressable in that it has multiple regions of different moieties, for example, different polynucleotide sequences, such that a region or feature or spot of the array at a particular predetermined location or address on the array can detect a particular target molecule or class of target molecules although a feature may incidentally detect non-target molecules of that feature.

The present devices and methods may be used in the synthesis of polypeptides. The synthesis of polypeptides involves the sequential addition of amino acids to a growing peptide chain. This approach comprises attaching a first amino acid to the functionalized surface of the support. In one approach the synthesis involves sequential addition of carboxyl-protected amino acids to a growing peptide chain with each additional amino acid in the sequence similarly protected and coupled to the terminal amino acid of the oligopeptide under conditions suitable for forming an amide linkage.

Such conditions are well known to the skilled artisan. See, for example, Merrifield, B. (1986), Solid Phase Synthesis, *Sciences* 232, 341–347. After polypeptide synthesis is complete, acid is used to remove the remaining terminal protecting groups.

The devices and methods of the present invention are particularly useful in the synthesis of oligonucleotide arrays for determinations of polynucleotides. As explained briefly above, in the field of bioscience, arrays of oligonucleotide probes, fabricated or deposited on a surface of a support, are used to identify DNA sequences in cell matter. The arrays generally involve a surface containing a mosaic of different oligonucleotides or sample nucleic acid sequences or polynucleotides that are individually localized to discrete, known areas of the surface. In one approach, multiple identical arrays across a complete front surface of a single substrate or support are used. However, the arrays produced on a given substrate need not be identical and some or all could be different. Each array may contain multiple spots or features and each array may be separated by spaces. Each feature, or element, within the molecular array is defined to be a small, regularly shaped region of the surface of the substrate. The features are arranged in a regular pattern. Each feature within the molecular array may contain a different molecular species, and the molecular species within a given feature may differ from the molecular species within the remaining features of the molecular array. A typical array may contain from about 100 to about 100,000 or more features. All of the features may be different, or some or all may be the same. Each feature may carry a predetermined polynucleotide having a particular sequence or a predetermined mixture of polynucleotides. While arrays may be separated from one another by spaces, and the features may be separated from one another by spaces, such spaces in either instance are not essential.

Biopolymer arrays can be fabricated by depositing previously obtained biopolymers (such as from synthesis or natural sources) onto a substrate, or by in situ synthesis methods. Methods of depositing obtained biopolymers include dispensing droplets to a substrate from dispensers such as pin or capillaries (such as described in U.S. Pat. No. 5,807,522) or such as pulse jets (such as a piezoelectric inkjet head, as described in PCT publications WO 95/25116 and WO 98/41531, and elsewhere). For in situ fabrication methods, multiple different reagent droplets are deposited from drop dispensers at a given target location in order to form the final feature (hence a probe of the feature is synthesized on the array substrate). The in situ fabrication methods include those described in U.S. Pat. No. 5,449,754 for synthesizing peptide arrays, and described in WO 98/41531 and the references cited therein for polynucleotides.

The in situ method for fabricating a polynucleotide array typically follows, at each of the multiple different addresses at which features are to be formed, the same conventional iterative sequence used in forming polynucleotides from nucleoside reagents on a support by means of known chemistry. This iterative sequence is as follows: (a) coupling a selected nucleoside through a phosphite linkage to a functionalized support in the first iteration, or a nucleoside bound to the substrate (i.e. the nucleoside-modified substrate) in subsequent iterations; (b) optionally, but preferably, blocking unreacted hydroxyl groups on the substrate bound nucleoside; (c) oxidizing the phosphite linkage of step (a) to form a phosphate linkage; and (d) removing the protecting group ("deprotection") from the now substrate bound nucleoside coupled in step (a), to generate a reactive site for the next cycle of these steps. The functionalized support (in the first cycle) or deprotected coupled nucleoside (in subsequent cycles) provides a substrate bound moiety with a linking group for forming the phosphite linkage with a next nucleoside to be coupled in step (a). Final deprotection of nucleoside bases can be accomplished using alkaline conditions such as ammonium hydroxide, in a known manner.

The foregoing chemistry of the synthesis of polynucleotides is described in detail, for example, in Caruthers, *Science* 230: 281–285, 1985; Itakura, et al., *Ann. Rev. Biochem.* 53: 323–356; Hunkapillar, et al., *Nature* 310: 105–110, 1984; and in "Synthesis of Oligonucleotide Derivatives in Design and Targeted Reaction of Oligonucleotide Derivatives", CRC Press, Boca Raton, Fla., pages 100 et seq., U.S. Pat. Nos. 4,458,066, 4,500,707, 5,153,319, and 5,869,643, EP 0294196, and elsewhere.

As mentioned above, various ways may be employed to introduce the reagents for producing an array of polynucleotides on the surface of a support such as a glass support. Such methods are known in the art. One such method is discussed in U.S. Pat. No. 5,744,305 (Fodor, et al.) and involves solid phase chemistry, photolabile protecting groups and photolithography. Binary masking techniques are employed in one embodiment of the above. Arrays are fabricated in situ, adding one base pair at a time to a primer site. Photolithography is used to uncover sites, which are then exposed and reacted with one of the four base pair phosphoramidites. In photolithography the surface is first coated with a light-sensitive resist, exposed through a mask and the pattern is revealed by dissolving away the exposed or the unexposed resist and, subsequently, a surface layer. A separate mask is usually made for each pattern, which may involve four patterns for each base pair in the length of the probe.

Another in situ method employs inkjet printing technology to dispense the appropriate phosphoramidite reagents and other reagents onto individual sites on a surface of a support. Oligonucleotides are synthesized on a surface of a substrate in situ using phosphoramidite chemistry. Solutions containing nucleotide monomers and other reagents as necessary such as an activator, e.g., tetrazole, are applied to the surface of a support by means of thermal ink-jet technology.

Individual droplets of reagents are applied to reactive areas on the surface using, for example, a thermal ink-jet type nozzle. The surface of the support may have an alkyl bromide trichlorosilane coating to which is attached polyethylene glycol to provide terminal hydroxyl groups. These hydroxyl groups provide for linking to a terminal primary amine group on a monomeric reagent. Excess of non-reacted chemical on the surface is washed away in a subsequent step. For example, see U.S. Pat. No. 5,700,637 and PCT WO 95/25116 and PCT application WO 89/10977.

Other methods for synthesizing arrays of oligonucleotides on a surface include those disclosed by Gamble, et al., WO97/44134; Gamble, et al., WO98/10858; Baldeschwieler, et al., WO95/25116; Brown, et al., U.S. Pat. No. 5,807,522; and the like.

In accordance with the present invention one or more or all of the synthetic steps in the synthesis of biopolymers on the surface of a support may be carried out using a flow device in accordance with the present invention. The steps include by way of illustration and not limitation monomer addition, washing of the surface of the support prior to or after a reaction, protection and deprotection of certain functionalities on the surface, oxidation or reduction of functionalities on the surface such as, e.g., oxidation of a phosphite group to a phosphate group, removal of protecting groups, blocking of sites to prevent reaction at such site, capping of sites that did not react with a phosphoramidite reagent, deblocking, and so forth. In addition, under certain circumstances other reactions may be carried out in a flow cell such as, for example, phosphoramidite monomer addition, modified phosphoramidite addition, other monomer additions, addition of a polymer chain to a surface for linking to monomers, and so forth. It should be noted that, while the discussion herein may be directed to the synthesis of biopolymers, this is by way of illustration and not limitation. The flow devices of the invention may be used for other synthetic reactions as will be suggested to those skilled in the art in view of the disclosure herein.

A flow device of the present invention comprises a housing having a cavity or housing chamber therein. The housing generally comprises a frame with suitable cross supports for structural strength. One or more walls of the housing may be formed from a solid material, which is attached to the main frame of the housing. In the latter embodiment cross supports for the frame may not be necessary since the solid material may provide sufficient structural strength.

The dimensions of the housing chamber are dependent on the dimensions of the support, the dimensions of which may vary depending on the nature of the support. For example, the support may be one on which a single array of chemical compounds is synthesized. In this regard the support is usually about 1.5 to about 5 inches in length and about 0.5 to about 3 inches in width. The support is usually about 0.1 to about 5 mm, more usually, about 0.5 to about 2 mm, in thickness. A standard size microscope slide is usually about 3 inches in length and 1 inch in width. Alternatively, multiple arrays of chemical compounds may be synthesized on the support, which is then diced, i.e., cut, into single array supports. In this alternative approach the support is usually about 5 to about 8 inches in length and about 5 to about 8 inches in width so that the support may be diced into multiple single array supports having the aforementioned dimensions. The thickness of the support is the same as that described above. In a specific embodiment by way of illustration and not limitation, a wafer that is $6\frac{5}{8}$ inches by 6 inches is employed and diced into one inch by 3 inch slides.

In general, the dimensions of the housing chamber should be sufficiently large enough so that the housing chamber can accommodate the support and the other elements of the present device. The above factors govern the dimensions of the housing chamber.

The frame of the housing is usually constructed from a suitable material that gives structural strength to the housing so that various moving parts may be mounted within the housing chamber. In addition, the structural strength must be sufficient to permit various pressure activations and deactivations and the like that occur in the use of the present device. Such materials include, for example, metal, plastic, and the like.

In one embodiment of a device in accordance with the present invention at least a portion of one wall of the housing has a viewing area for viewing a surface of the support that is inserted therein. Usually, this viewing area is in the form of a window in the wall of the housing. The window may be manufactured from any material that will permit viewing of the surface of the support. Such materials include by way of example and not limitation, transparent plastic, glass, and so forth. The viewing area permits the observation of the filling and emptying of the reagent chamber. With an appropriate sensor, the filling and emptying operations may be automated and monitored. The portion of the wall of the housing that permits viewing the surface of a support may be attached to the frame of the housing by suitable means such as screws, bolts, and so forth.

The housing has an opening, which is adapted for insertion of a support into the housing chamber. The opening may be in a solid wall of the housing or the frame of the housing may be adapted to permit the support to be inserted into the interior of the housing chamber. The dimensions of the opening in the housing for insertion of the support are dependent on the dimensions of the support and a holding element for the support. In general, the opening in the wall of the housing should be sufficiently large enough to permit the support and support holding element to be inserted into and removed from the housing chamber without interference with the sides of the opening. The opening should not larger than necessary to permit the insertion and removal of the support.

A sealing member is movably mounted in the housing chamber and is adapted to engage a surface of a support to form a reagent chamber between this surface of the support and a surface of the seal. The sealing member may be constructed from a single material or from multiple materials. Preferably, the sealing member comprises a rigid member that is usually a flat member constructed from plastic, metal, glass, and so forth. The perimeter of the sealing member comprises a member that is sufficiently flexible or compressible to sealingly engage a surface of a support to form a fluid tight seal that can be maintained under increased pressures encountered in the use of the device. The flexible member may be, for example, rubber, flexible plastic, and the like. The flexible material provides for a more reliable seal than with non-flexible materials and is more easily and inexpensively replaced. In any event the materials from which the sealing member is constructed must be substantially inert with respect to the fluids introduced into the reagent chamber and must not interfere with the reactions that occur within the reagent chamber. The flexible member is usually a gasket and may be in any shape such as, for example, circular, oval, rectangular, and the like. Preferably, the flexible member is in the form of an O-ring.

The dimensions of the flexible member are generally sufficient to provide a liquid tight seal for the reagent chamber. Usually the dimensions of the flexible member are governed by the dimensions of the reagent chamber and the support. For example, the dimensions of the flexible may be about 1 to about 4 mm, usually about 2 to about 3 mm in diameter. In general, it is desirable to leave as much surface of the support exposed for reactions that are to be carried out. The flexible member is usually seated in a groove in the surface of the rigid member around the perimeter. The dimensions of the groove are sufficient to seat the flexible member therein. In one particular embodiment the dimensions of the groove for the flexible member are designed to be non-standard or slightly smaller than the dimension of the flexible member. In this way deformation of the flexible member during formation of the reagent chamber causes the flexible member to form a tight seal of the path between the side of the groove and the flexible member.

The dimensions of the sealing member are dependent on the desired size of the reagent chamber. One consideration is the conservation of fluid reagents used in the synthetic steps to produce the chemical compounds on the surface of the support. The volume of the reagent chamber is usually about 5 to about 20 ml, more usually, about 10 to about 14 ml.

The present device comprises a mechanism for moving the sealing member within the housing chamber. Such mechanism may be, for example, pressure activated, and so forth. In one embodiment, the mechanism is a pressure-activated cylinder that is movable in a cylindrical housing that acts as a guide for the cylinder. The cylindrical housing is mounted on an interior wall of the housing chamber. The sealing member is attached to the cylinder by appropriate elements as is conventional in the art. In one embodiment the cylinder is adapted to assume a locked or non-movable position when it is fully extended within the housing chamber. In this way the integrity of the formed sealed reagent chamber is maintained under the pressures employed with the fluid reagents.

The housing further comprises an inlet and an outlet. The inlet may be used for introducing fluid reagents into the reagent chamber and removing fluid reagents from the reagent chamber. The outlet may be used for venting the interior of the reagent chamber or for removing fluid reagents from the reagent chamber. Both the inlet and the outlet may be in the same wall of the housing or each may be in a different wall of the housing. Both the inlet and the outlet are in fluid communication with the reagent chamber. In one approach the inlet and the outlet may each be connected to tubing that enters a respective wall of the housing through an opening in the wall or through a side of the housing that is constructed of only cross supports. The dimensions of the tubing are generally dependent on the dimensions of the reagent chamber. The dimensions of the tubing must be sufficient to deliver and remove the desired amounts of fluid reagents to and from the reagent chamber. In a particular embodiment the inlet and outlet are connected to the sealing member so that fluids may be introduced into and removed from the reagent chamber through the rigid member of the sealing member. Appropriate connectors as known in the art may be used to connect the tubing to the sealing member.

The inlet and the outlet may be disposed at or near the corners of the rigid member of the sealing member. For example, the inlet may be disposed in a corner of the rigid member opposite a corner in which the outlet is disposed. In general, the inlet and the outlet in the rigid member are disposed to provide for efficient entry into and removal of fluid reagents from the reagent chamber. In one embodiment the inlet may be at or near the center of the rigid member and one or more outlets are employed, each of which is disposed in a corner of the rigid member. This latter embodiment provides for more efficient filling of the reagent chamber and reduces the level of bubble formation.

The present device may also comprise a mechanism adapted to engage the support on a surface opposite the surface engaged by the sealing member. This mechanism is designed to urge the support in the direction of the sealing member to assist in disengaging the support from the support holding element. The mechanism also assists in the formation of a sealed reagent chamber when the support is subsequently urged into contact with an interior wall of the housing chamber. Fluids are usually pressurized or pumped to promote their travel into and out of the reagent chamber. Accordingly, the seal of the reagent chamber must be sufficient to withstand the pressures that may be experienced in the reagent chamber. The mechanism also assists in disengaging the support from the support holding element after the support and holding element have been inserted into the housing chamber and also assists in securing the support in the housing chamber. In one embodiment the aforesaid mechanism comprises two to four pressure-activated cylinders, each of which is disposed in a port in a wall of the housing. Where the wall comprises a viewing area such as a window, the ports for the pressure-activated cylinders pass through the window.

As mentioned above, the support is normally delivered into the opening in the wall of the housing by engagement with a holding element, which usually comprises a main arm and an end portion that contacts and engages a surface of the support. In one embodiment the holding element is vacuum activated. The holding element may comprise at least two prongs and may be in the form of a fork. Other embodiments of the holding element include, for example, grasping elements such as movable finger-like projections, and the like. The holding element is usually part of a transfer robot that comprises a robotic arm that is capable of transferring the support from various positions where steps in the synthesis of the chemical compound are performed such as between several flow devices in accordance with the present invention. In one embodiment a transfer robot is mounted on the main platform. The transfer robot may comprise a base, an arm that is movably mounted on the base, and an element for holding the support during transport that is attached to the arm.

In one embodiment of the present device structures are integrated into the device to vary the flow characteristics within the reagent chamber. These structures provide for enhanced mixing of fluid reagents introduced into the reagent chamber as well as enhanced washing of the surface of the support. Examples of such structures by way of illustration and not limitation include projections, indentations, and the like. In one embodiment, the structures are on a surface of the rigid member of the sealing member.

Figure 1:
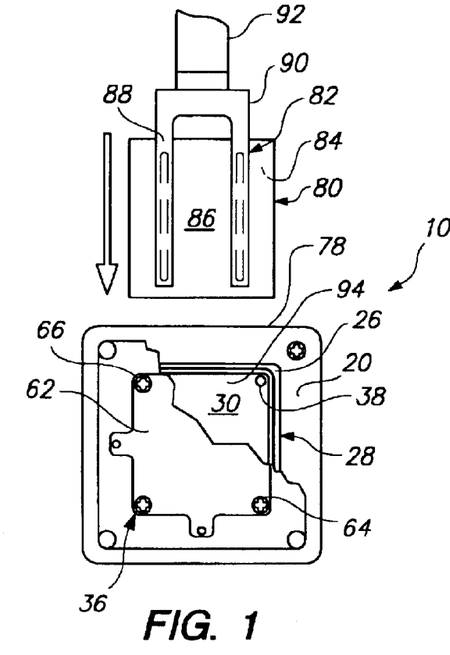
FIG. 1 is a schematic diagram depicting a front view of one embodiment of a flow device in accordance with the present invention.
Figure 2:
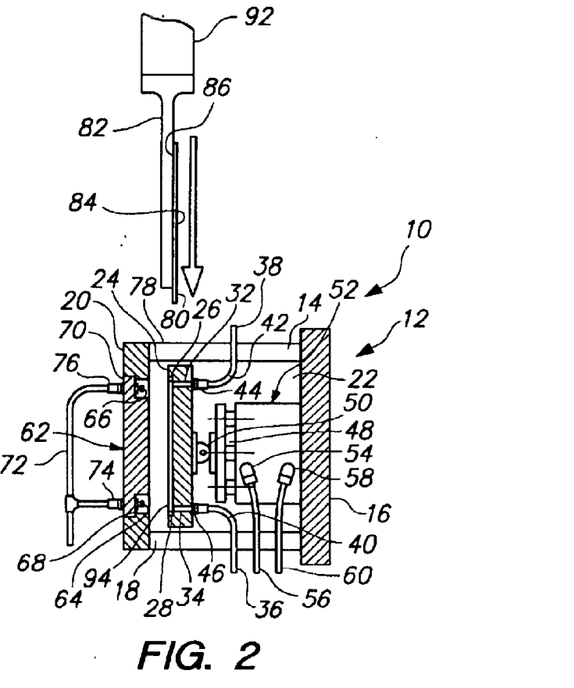
FIG. 2 is a schematic diagram depicting a side view of the embodiment of the flow device of FIG. 1.
Figure 8:
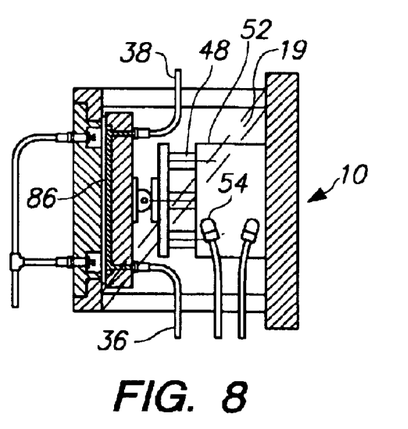
FIG. 8 is a schematic diagram depicting a side view of the embodiment of the flow device of FIG. 1 with a reagent chamber formed therein and filled with a fluid reagent.

One embodiment of the present invention is depicted in FIGS. 1–2. Flow device 10 is shown and comprises housing 12 formed by a frame comprising members 14, 16, 18 and 20. Members 14 and 18 each comprise two beam supports connecting the top and bottom of wall member 16 and wall member 20. The frame also comprises cross supports 19 shown in broken lines in FIG. 8. Cross supports 19 connect between one end of beam support of member 14 with an opposing end of beam support 18. The interior of housing 12 is housing chamber 22. Sealing member 24 is movably mounted in housing chamber 22. Sealing member 24 is comprised of plate 26 and flexible member 28, which circles the perimeter of surface 30 of plate 26. Openings 32 and 34 pass through plate 26 and inlet 36 and outlet 38 are respectively in fluid communication with openings 32 and 34. Inlet 36 and outlet 38 take the form of tubes 40 and 42, respectively, which are attached to openings 32 and 34, respectively, by means of connectors 44 and 46. Plate 26 is attached to pressure-activated cylinder 48 by means of gimbal 50. Cylinder 48 is slidably mounted in cylinder guide 52, which is fixedly attached to the interior of wall 16 of housing 12. Port 54 in cylinder guide 52 is connected to tubing 56 that passes through wall 18 of housing 12. Port 58 in cylinder guide 52 is connected to tubing 60 that also passes through wall 18 of housing 12. Wall 20 comprises window 62 for viewing the surface of a support that is inserted into housing chamber 22. Device 10 also comprises ports 64, 65, 66 and 67 in window 62. In each port lie pressure-activated cylinders 68, 69, 70 and 71, respectively. Ports 64, 65, 66 and 67 are connected to tubing 72 by connectors 74, 75, 76 and 77, respectively. Cylinders 68, 69, 70 and 71 are designed to engage a support inserted into housing chamber 22 on a surface opposite the surface engaged by sealing member 24 and to urge the support in the direction of sealing member 24. The space between beam supports 14 comprises opening 78 that permits ingress and egress into housing chamber 22 of support 80 engaged by vacuum end effector 82.

Figure 3:
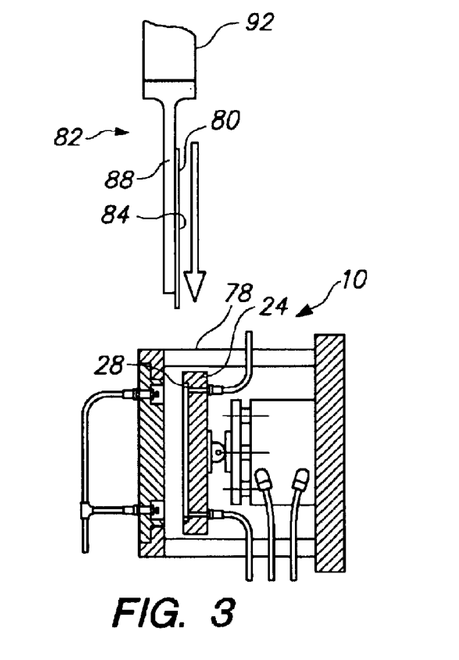
FIG. 3 is a schematic diagram depicting a side view of the embodiment of the flow device of FIG. 1 prior to the placement of a support therein.
Figure 4:
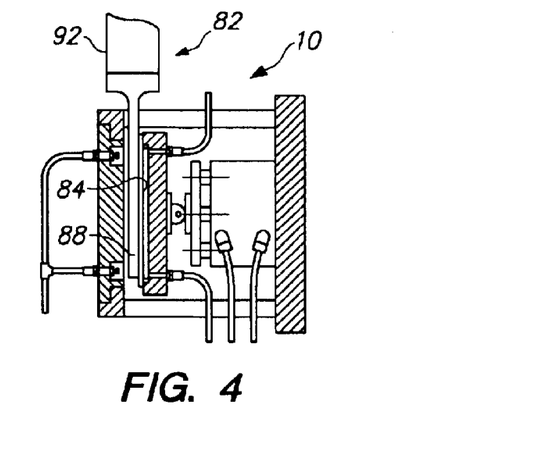
FIG. 4 is a schematic diagram depicting a side view of the embodiment of the flow device of FIG. 1 with a support and support holding element placed therein.
Figure 5:
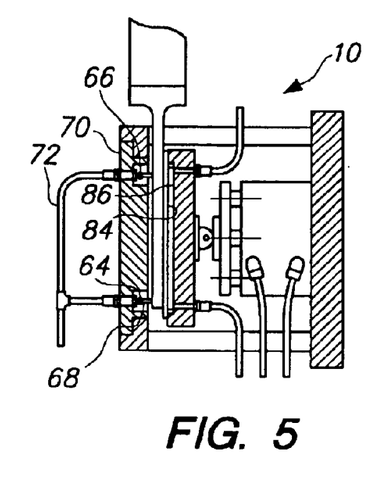
FIG. 5 is a schematic diagram depicting a side view of the embodiment of the flow device of FIG. 1 with a support placed therein and engaged for removal of the holding element for the support.
Figure 6:
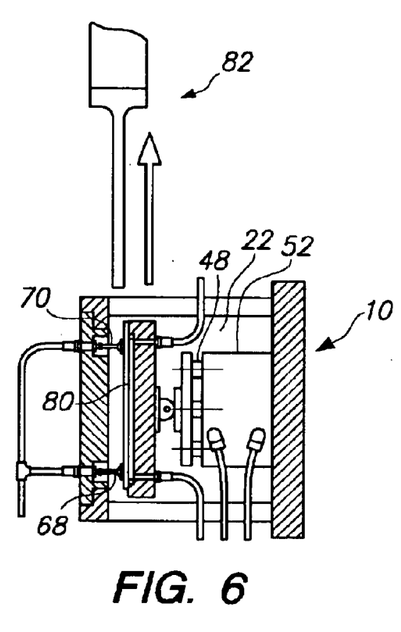
FIG. 6 is a schematic diagram depicting a side view of the embodiment of the flow device of FIG. 1 with a support placed therein and the holding element withdrawn.
Figure 7:
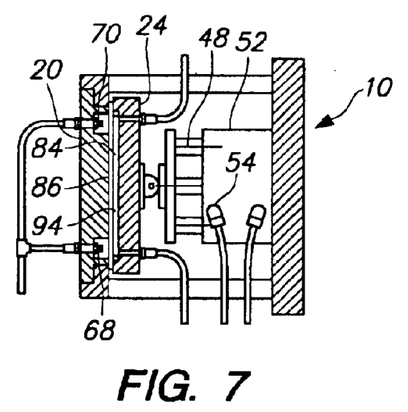
FIG. 7 is a schematic diagram depicting a side view of the embodiment of the flow device of FIG. 1 with a support placed therein and further depicting the formation of a reagent chamber therein.

The operation of device 10 is discussed next with reference to FIGS. 3–8. FIG. 3 depicts device 10 prior to insertion of support 80 engaged by vacuum end effector 82. Referring to FIG. 4, vacuum end effector 82 with support 80 engaged is inserted through opening 78 into the interior of housing 12. Support 80 is inserted in such a way as to lie adjacent sealing member 24 so that surface 84 of support 80 lies against flexible member 28 of sealing member 24. Referring to FIG. 5 pressure-activated cylinders 68, 69, 70 and 71 are activated by applying pressure through tubing 72 to ports 64, 65, 66 and 67. As a result of the applied pressure, cylinders 68, 69, 70 and 71 extend forward and engage surface 86 of support 80 urging support 80 toward flexible member 28. As can be seen from FIG. 1, vacuum end effector 82 has two fingers 88 and 90 projecting from a main arm 92. With this configuration the ends of cylinders 68, 69, 70 and 71 are able to engage surface 86 of support 80 without engaging, and without interference from, vacuum end effector 82. FIG. 6 shows vacuum end effector 82 removed from housing chamber 22 leaving support 80 secured therein. Referring to FIG. 7, pressure is applied to pressure-activated cylinder 48 through port 58, with port 54 serving as a vent, so that cylinder 48 moves, thus urging attached sealing member 24 toward surface 84 of support 80. In this way sealing member 24 and support 80 are urged toward the interior of wall 20. Pressure-activated cylinders 68, 69, 70 and 71 are retracted into ports 64 and 66 because pressure is no longer applied to cylinders 68, 69, 70 and 71. In this way surface 86 of support 80 is urged against the interior surface of wall 20. Furthermore, reagent chamber 94 is now fully formed and fluid reagent 96 is introduced therein through inlet 36 with outlet 38 serving to vent reagent chamber 94 (see FIG. 8). After a predetermined period of time generally sufficient for the desired portion of a step in the synthesis of a chemical compound, fluid reagent 96 is removed from reagent chamber 94 either through inlet 36 with outlet 38 serving as a vent or through outlet 38 with inlet 36 serving as a vent. Subsequent fluid reagents may be introduced and removed in a similar manner.

Figure 9:
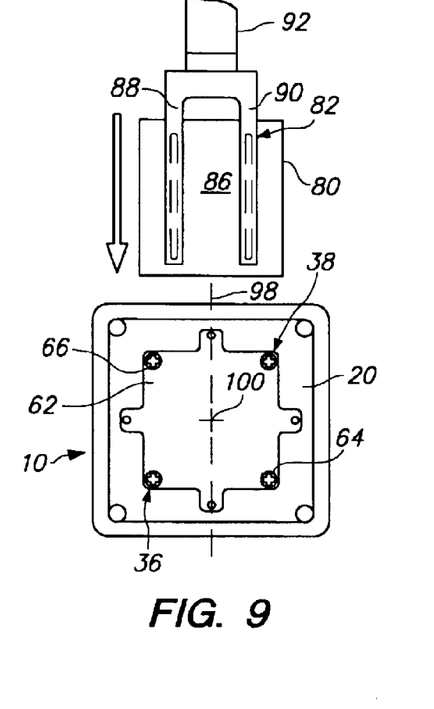
FIG. 9 is a schematic diagram depicting a front view of the embodiment of the flow device of FIG. 1 oriented for insertion of a support and support holding element.
Figure 10:
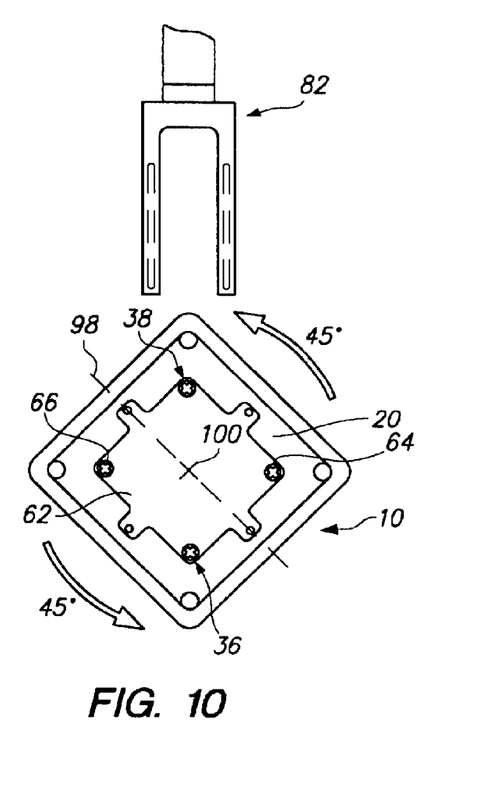
FIG. 10 is a schematic diagram depicting a front view of the embodiment of the flow device of FIG. 1 rotated 45 degrees for introduction of a fluid reagent into the reagent chamber.

In a particular embodiment of the present invention, device 10 is rotatable on a frame or main platform. Referring to FIG. 9 the orientation of device 10 is shown with respect to vacuum end effector 82. In accordance with this aspect of the invention device 10 is maintained in this orientation during the aforementioned steps of formation of reagent chamber 94 and introduction of fluid reagent 96. Once fluid reagent 96 is introduced into reagent chamber 94, device 10 is rotated along a horizontal axis 100 perpendicular to the plane of wall 20 of device 10. The rotation of device 10 is approximately about 20 to about 45 degrees, usually about 30 degrees as shown in FIG. 10. The angle of rotation is with respect to the orientation of device 10 as shown in FIG. 9 and in particular with respect to vertical line 98 that dissects device 10. Rotation of device 10 is carried out so that inlet 36 and outlet 38 are rotated into an orientation wherein inlet 36 is at a bottom position and outlet 38 is at a top position. This latter orientation helps to assure that fluid reagent 96 is able to fully flood surface 84 of support 80. Surface 84 is the surface of the support that is functionalized for reaction with fluid reagents for the synthesis of chemical compounds on the surface. Furthermore, filling and emptying reagent chamber 94 with fluid reagent 96 is accomplished more efficiently when the rotation of device 10 is employed. Filling and emptying reagent chamber 94 with fluid reagent 96 occurs at a rate that is faster for the orientation of device 10 in FIG. 10 than the rate for the orientation of device 10 in FIG. 9. In addition, bubble formation is reduced with the change in orientation as shown.

The present flow devices may be employed to perform one or more steps of a chemical reaction on the surface of a support. A support is placed into a chamber of a device such as described above. The mechanism adapted to engage the support on a surface opposite the surface engaged by the sealing member is activated to urge the support toward the sealing member. The pressure-activated mechanism is activated to urge the support against the aforesaid mechanism and against an interior wall of the housing chamber to form the reagent chamber. A fluid reagent for conducting the reaction step is introduced into the reagent chamber by means of the inlet. Thereafter, the fluid reagent is removed from the reagent chamber. The pressure-activated mechanism is deactivated and the support is removed from the housing chamber. In this way the reagent chamber is no longer formed, that is, there is no longer a closed chamber partly defined by the surface. Accordingly, the reagent chamber becomes un-formed.

In one embodiment of the present invention a plurality of biopolymers may be synthesized on the surface of a support. The synthesis comprises a plurality of monomer additions. After each of the monomer additions, the support is placed into a chamber of a first device as described above. The surface of the support is subjected to a first step of the synthesis that is subsequent to a monomer addition. Then, the support is placed into a chamber of a second device as described above. The surface of the support is subjected to a second step of the synthesis that is subsequent to the first step.

Another embodiment of the present invention is an apparatus for synthesizing an array of biopolymers on the surface of a support. The apparatus comprises a platform on which are mounted a plurality of devices as described above. The apparatus also comprises one or more fluid dispensing stations mounted on the platform. The stations are in fluid communication with one or more of the devices. A station for monomer addition to the surface of the support is mounted on the platform. The apparatus also comprises a mechanism, which comprises a holding element for moving a support to and from the station for monomer addition and one of the devices and from one of the devices to another of the devices. The apparatus optionally comprises a mechanism for rotating the devices.

The inlet of the flow device is usually in fluid communication with an element that controls the flow of fluid into the flow cell such as, for example, a manifold, a valve, and the like or combinations thereof. This element in turn is in fluid communication with one or more fluid reagent dispensing stations. In this way different fluid reagents for one step in the synthesis of the chemical compound may be introduced sequentially into the flow device. These reagents may be, for example, a chemical reagent that forms part of the chemical compound by addition thereto, wash fluids, oxidizing agents, reducing agents, blocking or protecting agents, unblocking or deprotecting agents, and so forth. Any reagent that is normally a solid reagent may be converted to a fluid reagent by dissolution in a suitable solvent, which may be a protic solvent or an aprotic solvent. The solvent may be an organic solvent such as, by way of illustration and not limitation, oxygenated organic solvents of from 1 to about 6, more usually from 1 to about 4, carbon atoms, including alcohols such as methanol, ethanol, propanol, etc., ethers such as tetrahydrofuran, ethyl ether, propyl ether, etc., acetonitrile, dimethylformamide, dimethylsulfoxide, and the like. The solvent may be an aqueous medium that is solely water or may contain a buffer, or may contain from about 0.01 to about 80 or more volume percent of a cosolvent such as an organic solvent as mentioned above.

The fluid dispensing stations are usually affixed to the main platform to which the flow cells are mounted. Any fluid dispensing station may be employed that dispenses fluids such as water, aqueous media, organic solvents and the like. The fluid dispensing station may comprises a pump for moving fluid and may also comprise a valve assembly and a manifold as well as a means for delivering predetermined quantities of fluid to the flow cell. The fluids may be dispensed by pumping from the dispensing station. In this regard any standard pumping technique for pumping fluids may be employed in the present apparatus. For example, pumping may be by means of a peristaltic pump, a pressurized fluid bed, a positive displacement pump, e.g., a syringe pump, and the like. In one embodiment a sensing element may be employed to follow the filling and emptying of the flow device.

The amount of the reagents employed in each synthetic step in the method of the present invention is dependent on the nature of the reagents, solubility of the reagents, reactivity of the reagents, availability of the reagents, purity of the reagents, and so forth. Such amounts should be readily apparent to those skilled in the art in view of the disclosure herein. Usually, stoichiometric amounts are employed, but excess of one reagent over the other may be used where circumstances dictate. Typically, the amounts of the reagents are those necessary to achieve the overall synthesis of the chemical compound in accordance with the present invention. The time period for conducting the present method is dependent upon the specific reaction and reagents being utilized and the chemical compound being synthesized.

Figure 11:
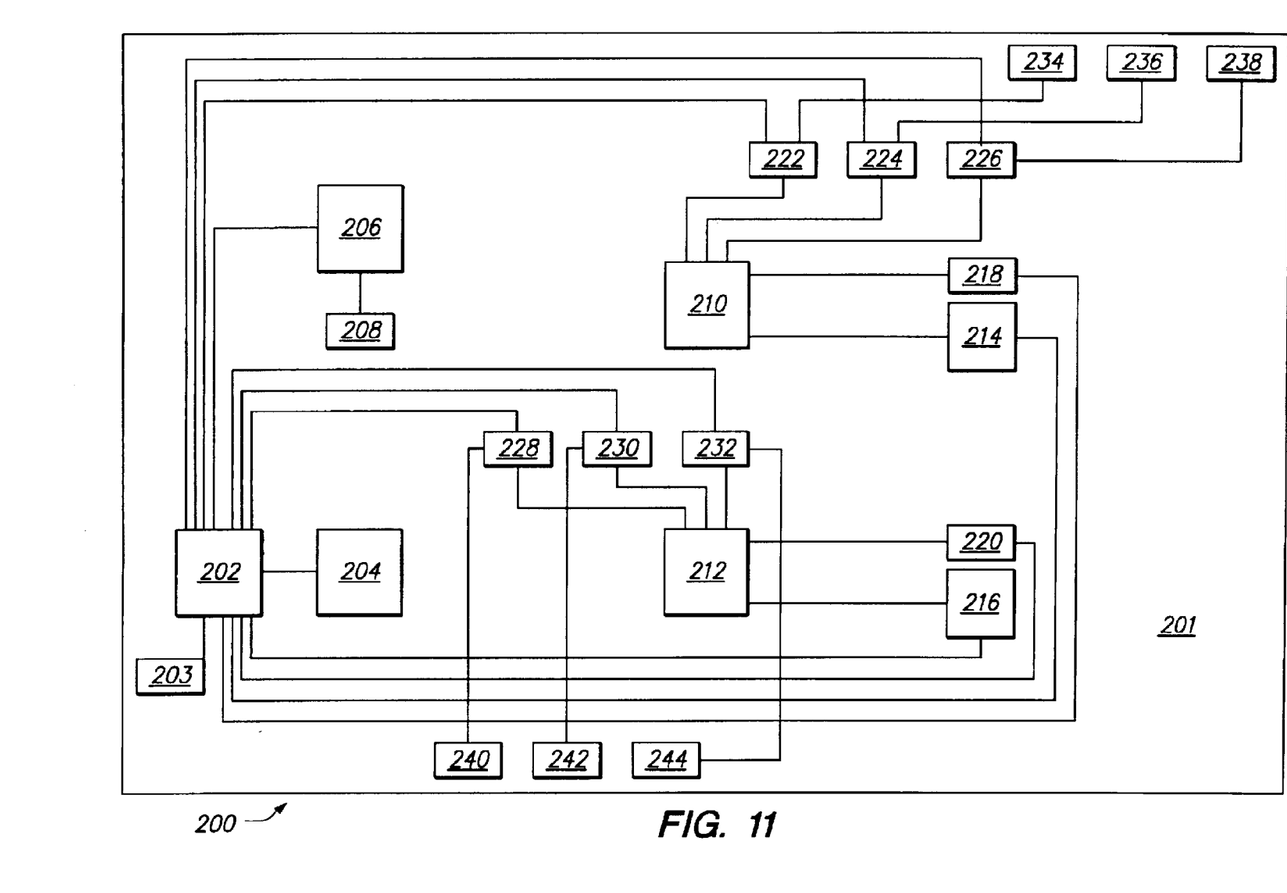
FIG. 11 is a schematic diagram of an apparatus employing at least two flow devices in accordance with the present invention.

One embodiment of an apparatus in accordance with the present invention is depicted in FIG. 11 in schematic form. Apparatus 200 comprises platform 201 on which the components of the apparatus are mounted. Apparatus 200 comprises main computer 202, with which various components of the apparatus are in communication. Video display 203 is in communication with computer 202. Apparatus 200 further comprises print chamber 204, which is controlled by main computer 202. The nature of print chamber 204 depends on the nature of the printing technique employed to add monomers to a growing polymer chain. Such printing techniques include, by way of illustration and not limitation, inkjet printing, and so forth. Transfer robot 206 is also controlled by main computer 202 and comprises a robot arm 208 that moves a support to be printed from print chamber 204 to either first flow cell 210 or second flow cell 212. In one embodiment robot arm 208 introduces a support into print chamber 204 horizontally for printing on a surface of the support and introduces the support into a flow device of the invention vertically. First flow device 210 of the invention is in communication with program logic controller 214, which is controlled by main computer 202, and second flow device 212 of the invention is in communication with program logic controller 216, which is also controlled by main computer 202. First flow device 210 is in communication with flow sensor and level indicator 218, which is controlled by main computer 202, and second flow device 212 is in communication with flow sensor and level indicator 220, which is also controlled by main computer 202. First flow device 210 is in fluid communication with manifolds 222, 224 and 226, each of which is controlled by main computer 202 and each of which is in fluid communication with a source of fluid reagents, namely, 234, 236 and 238, respectively. Second flow device 212 is in fluid communication with manifolds 228, 230 and 2232, each of which is controlled by main computer 202 and each of which is in fluid communication with a source of fluid reagents, namely, 240, 242 and 244, respectively.

The apparatus of the invention further comprise appropriate electrical and mechanical architecture and electrical connections, wiring and devices such as timers, clocks, and so forth for operating the various elements of the apparatus. Such architecture is familiar to those skilled in the art and will not be discussed in more detail herein.

The methods in accordance with the present invention may be carried out under computer control, that is, with the aid of a computer. For example, an IBM® compatible personal computer (PC) may be utilized. The computer is driven by software specific to the methods described herein. A preferred computer hardware capable of assisting in the operation of the methods in accordance with the present invention involves a system with at least the following specifications: Pentium® processor or better with a clock speed of at least 100 MHz, at least 32 megabytes of random access memory (RAM) and at least 80 megabytes of virtual memory, running under either the Windows 95 or Windows NT 4.0 operating system (or successor thereof).

Software that may be used to carry out the methods may be, for example, Microsoft Excel or Microsoft Access, suitably extended via user-written functions and templates, and linked when necessary to stand-alone programs that perform homology searches or sequence manipulations. Examples of software or computer programs used in assisting in conducting the present methods may be written, preferably, in Visual BASIC, FORTRAN and C++, as exemplified below in the Examples. It should be understood that the above computer information and the software used herein are by way of example and not limitation. The present methods may be adapted to other computers and software. Other languages that may be used include, for example, PASCAL, PERL or assembly language.

A computer program may be utilized to carry out the above method steps. The computer program provides for (i) securing a support to a support holding element, (ii) placing the support and the support holding element into a chamber of a flow device as described above, (iii) activating a mechanism adapted to engage the support on a surface opposite the surface engaged by the sealing member to urge the support toward the sealing member of the flow device and to disengage the support from the support holding element, (iv) removing the support holding element from the chamber of the flow device, (v) activating the pressure-activated mechanism to urge the support against the aforesaid mechanism and against an interior wall of the housing chamber to form the reagent chamber, (vi) introducing a fluid reagent for conducting the reaction step into the reagent chamber by means of the inlet, (vii) removing the fluid reagent from the reagent chamber, (viii) deactivating the pressure-activated mechanism, and (ix) removing the support from the housing chamber. Another aspect of the present invention is a computer program product comprising a computer readable storage medium having a computer program stored thereon which, when loaded into a computer, performs the aforementioned method.

The above supports may be employed in various assays involving biopolymers. For example, following receipt by a user of an array made by an apparatus or method of the present invention, it will typically be exposed to a sample (for example, a fluorescent-labeled polynucleotide or protein containing sample) and the array is then read. Reading of the array may be accomplished by illuminating the array and reading the location and intensity of resulting fluorescence at each feature of the array. For example, a scanner may be used for this purpose where the scanner may be similar to, for example, the GENEARRAY scanner available from Agilent Technologies, Palo Alto, Calif. Other suitable apparatus and methods are described in U.S. patent applications: Ser. No. 09/846,125 "Reading Multi-Featured Arrays" by Dorsel, et al.; and Ser. No. 09/430,214 "Interrogating Multi-Featured Arrays" by Dorsel, et al. The relevant portions of these references are incorporated herein by reference. However, arrays may be read by methods or apparatus other than the foregoing, with other reading methods including other optical techniques (for example, detecting chemiluminescent or electroluminescent labels) or electrical techniques (where each feature is provided with an electrode to detect hybridization at that feature in a manner disclosed in U.S. Pat. No. 6,221,583 and elsewhere). Results from the reading may be raw results (such as fluorescence intensity readings for each feature in one or more color channels) or may be processed results such as obtained by rejecting a reading for a feature that is below a predetermined threshold and/or forming conclusions based on the pattern read from the array (such as whether or not a particular target sequence may have been present in the sample). The results of the reading (processed or not) may be forwarded (such as by communication) to a remote location if desired, and received there for further use (such as further processing).

When one item is indicated as being "remote" from another, this is referenced that the two items are at least in different buildings, and may be at least one mile, ten miles, or at least one hundred miles apart. "Communicating" information references transmitting the data representing that information as electrical signals over a suitable communication channel (for example, a private or public network). "Forwarding" an item refers to any means of getting that item from one location to the next, whether by physically transporting that item or otherwise (where that is possible) and includes, at least in the case of data, physically transporting a medium carrying the data or communicating the data.

All publications and patent applications cited in this specification are herein incorporated by reference as if each individual publication or patent application were specifically and individually indicated to be incorporated by reference.

Although the foregoing invention has been described in some detail by way of illustration and example for purposes of clarity of understanding, it will be readily apparent to those of ordinary skill in the art in light of the teachings of this invention that certain changes and modifications may be made thereto without departing from the spirit or scope of the appended claims.

What is claimed is:

1. A flow device comprising:

(a) a housing comprising a housing chamber, (b) an opening in said housing adapted for insertion of a support into said housing chamber, (c) a sealing member movably mounted in said housing chamber and adapted to engage said support to form a reagent chamber between a surface of said support and a surface of said sealing member, (d) a mechanism for moving said sealing member within said housing chamber, (e) a mechanism adapted to engage and hold said support, during said insertion, on a surface opposite said surface engaged by said sealing member and, in cooperation with said mechanism of step (d), to move said support engaged by said sealing member within said housing chamber, (f) an inlet in fluid communication with said reagent chamber and (g) an outlet in fluid communication with said reagent chamber.

2. A device according to claim 1 further comprising a viewing area in a wall of said housing adapted to view a surface of said support.

3. A device according to claim 2 wherein said viewing area is a window in a wall of said housing.

4. A device according to claim 3 wherein said mechanism adapted to engage said support on a surface opposite said surface engaged by said sealing member moves said support against said wall.

5. A device according to claim 4 wherein said mechanism adapted to engage said support comprises two to four pressure-activated cylinders, each of which is disposed in a port in said window.

6. A device according to claim 1 wherein said support is engaged by a holding element and said opening in said housing is adapted to receive said support secured by said holding element.

7. A device according to claim 6 wherein said holding element is a vacuum actuated element.

8. A device according to claim 6 wherein said holding element is part of a robotic arm.

9. A device according to claim 1 further comprising a pressure-activated mechanism to which said sealing member is attached.

10. A device according to claim 9 wherein said pressure-activated mechanism is a pressure-activated cylinder.

11. A device according to claim 10 wherein said cylinder further comprises a guide.

12. A flow device comprising:

(a) a housing comprising a housing chamber, (b) an opening in said housing adapted for insertion of a holding element comprising a support into said housing chamber, (c) a sealing member movably mounted in said housing chamber and adapted to engage said support to form a reagent chamber between a surface of said support and a surface of said sealing member, wherein said sealing member is attached to a pressure-activated mechanism for moving said sealing member within said housing chamber without movement of said housing, (d) a mechanism adapted to engage said support on a surface opposite said surface engaged by said sealing member, (e) an inlet in fluid communication with said reagent chamber, (f) an outlet in fluid communication with said reagent chamber, and (g) a viewing area in a wall of said housing adapted to view a surface of said support.

13. A device according to claim 12 wherein said viewing area is a window in a wall of said housing.

14. A device according to claim 12 wherein said mechanism adapted to engage said support on a surface opposite said surface engaged by said sealing member comprises two to four pressure-activated cylinders, each of which is disposed in a port in said window.

15. A device according to claim 14 wherein said holding element is a vacuum actuated element.

16. A device according to claim 15 wherein said holding element is part of a robotic arm.

17. A device according to claim 12 said pressure-activated mechanism is a pressure-activated cylinder within a guide.

18. A device according to claim 12 wherein said device is rotatably mounted on a frame.

19. A flow device comprising:

(a) a sealing member adapted for sealing engagement with a support to form a reagent chamber in situ and a first mechanism adapted to move said sealing member, (b) a second mechanism adapted to engage and hold said support on a surface opposite said surface engaged by said sealing member and, in cooperation with said first mechanism, to move said reagent chamber, (c) an inlet in fluid communication with said reagent chamber, and (d) an outlet in fluid communication with said reagent chamber.

20. A flow device comprising:

(a) a housing comprising a housing chamber, (b) an opening in said housing adapted for insertion of a support into said housing chamber, (c) a sealing member movably mounted in said housing chamber and adapted to engage said support to form a reagent chamber between a surface of said support and a surface of said sealing member, (d) a mechanism for moving said sealing member within said housing chamber wherein said mechanism comprises a pressure-activated cylinder, (e) an inlet in fluid communication with said reagent chamber, and (f) an outlet in fluid communication with said reagent chamber.

21. A flow device comprising:

(a) a housing comprising a housing chamber, (b) an opening in said housing adapted for insertion of a holding element comprising a support into said housing chamber, (c) a sealing member movably mounted in said housing chamber and adapted to engage said support to form a reagent chamber between a surface of said support and a surface of said sealing member, wherein said sealing member is attached to a pressure-activated mechanism for moving said sealing member within said housing chamber, (d) a mechanism adapted to engage said support on a surface opposite said surface engaged by said sealing member, (e) an inlet in fluid communication with said reagent chamber, and (f) an outlet in fluid communication with said reagent chamber, and wherein said holding element is a vacuum actuated element for holding said support and said device further comprises a mechanism for moving the vacuum actuated element from said flow device to another flow device.

22. A device according to claim 21 wherein the vacuum actuated element comprises at least two prongs.

23. A device according to claim 21 wherein the mechanism is part of a robotic arm.

24. A device according to claim 20 wherein said viewing area is a window in a wall of said housing.

25. A device according to claim 20 wherein said mechanism adapted to engage said support on a surface opposite said surface engaged by said sealing member comprises two to four pressure-activated cylinders, each of which is disposed in a port in said window.

26. A device according to claim 25 wherein said holding element is a vacuum actuated element.

27. A device according to claim 26 wherein said holding element is part of a robotic arm.

28. A device according to claim 20 said pressure-activated cylinder is within a guide.

29. A device according to claim 20 wherein said device is rotatably mounted on a frame.

30. A flow device according to claim 19 wherein said first mechanism for moving said sealing member moves said sealing member into engagement with said support.

31. A flow device according to claim 30 wherein said second mechanism adapted to engage said support on a surface opposite said surface engaged by said sealing member and said first mechanism for moving said sealing member into engagement with said support cooperate to move said support against a wall.

32. A flow device according to claim 31 additionally comprising a window in the wall.

33. A flow device according to claim 30 comprising said support in engagement with said second mechanism adapted to engage said support on a surface opposite said surface engaged by said sealing member and said first mechanism for moving said sealing member into engagement with said support, wherein said support comprises a chemical array.

* * * * *